United States Patent [19]

Kuusisto et al.

[11] Patent Number: 5,574,338
[45] Date of Patent: Nov. 12, 1996

[54] CONTROL CIRCUIT FOR GAS DISCHARGE LAMPS, WHICH HAS A TRANSFORMER WITH START AND RUN WINDINGS

[75] Inventors: Douglas R. Kuusisto, Burnsville; Eric G. Persson, Minnetonka, both of Minn.

[73] Assignee: Nicollet Technologies Corporation, Minneapolis, Minn.

[21] Appl. No.: 487,503

[22] Filed: Jun. 7, 1995

[51] Int. Cl.⁶ .................................................. H05B 41/36
[52] U.S. Cl. ...................... 315/307; 315/226; 315/DIG. 5
[58] Field of Search ............................. 315/307, DIG. 5, 315/DIG. 7, 291, 225, 224, 226, 209 R

[56] References Cited

U.S. PATENT DOCUMENTS

| | | | |
|---|---|---|---|
| 3,199,020 | 8/1965 | Hilker | 323/89 |
| 3,319,154 | 5/1967 | Rudge | 323/48 |
| 4,286,193 | 8/1981 | King, Jr. et al. | 315/175 |
| 4,663,569 | 5/1987 | Alley et al. | 315/175 |
| 4,742,276 | 5/1988 | Ku | 315/106 |
| 4,900,989 | 2/1990 | Suenaga et al. | 315/224 |
| 5,083,065 | 1/1992 | Sakata et al. | 315/307 |
| 5,144,205 | 9/1992 | Motto et al. | 315/244 |
| 5,166,597 | 11/1992 | Larsen et al. | 323/215 |
| 5,327,047 | 7/1994 | Gershen | 315/194 |
| 5,331,253 | 7/1994 | Counts | 315/209 R |
| 5,374,875 | 12/1994 | Shackle et al. | 315/247 |
| 5,406,174 | 4/1995 | Slegers | 315/219 |
| 5,410,220 | 4/1995 | von Hertzen | 315/209 R |

OTHER PUBLICATIONS

"Control of Line–Frequency Controlled Rectifiers and Inverters," N. Mohan, T. M. Undeland, W. P. Robbins, *Power Electronics: Converters, Applications, and Design,* Copyright 1989 by John Wiley & Sons, Inc. pp. 42–45.

"Single–Phase Full–Wave Controller," S. B. Dewan, A. Straughen, *Power Semiconductor Circuits,* Copyright 1975 by John Wiley & Sons, Inc., pp. 160–161.

"Silicon Controlled Rectifiers," B. D. Wedlock, J. K. Roberge, *Electronic Components and Measurements,* Copyright 1969 by Prentice-hall, Inc., Englewood Cliffs, NJ, pp. 329–332.

*Primary Examiner*—Robert Pascal
*Assistant Examiner*—David Vu
*Attorney, Agent, or Firm*—Westman Champlin & Kelly

[57] ABSTRACT

A control circuit for a gas discharge lamp according to the present invention includes a transformer having a primary run winding, a primary start winding and a secondary winding. The primary run winding is coupled to a source of an AC run signal. The secondary winding is coupled to the gas discharge lamp. A current sensor is coupled in series with the gas discharge lamp to sense current flow through the lamp. A high frequency oscillator is coupled to the primary start winding for providing a high frequency start signal to the primary start winding. In a start phase, the oscillator provides the high frequency start signal to the primary start winding to initiate ionization of the gas discharge lamp. Once the gas has sufficiently ionized in the lamp, the control circuit switches from the start phase to a run phase by removing the high frequency start signal from the primary start winding and applying the AC run signal to the primary run winding. Switching between the high frequency start signal and the AC run signal on the low voltage primary side of the transformer allows the transformer to be sized much smaller to match the operating characteristics of the bulb as opposed to its start characteristics.

28 Claims, 3 Drawing Sheets

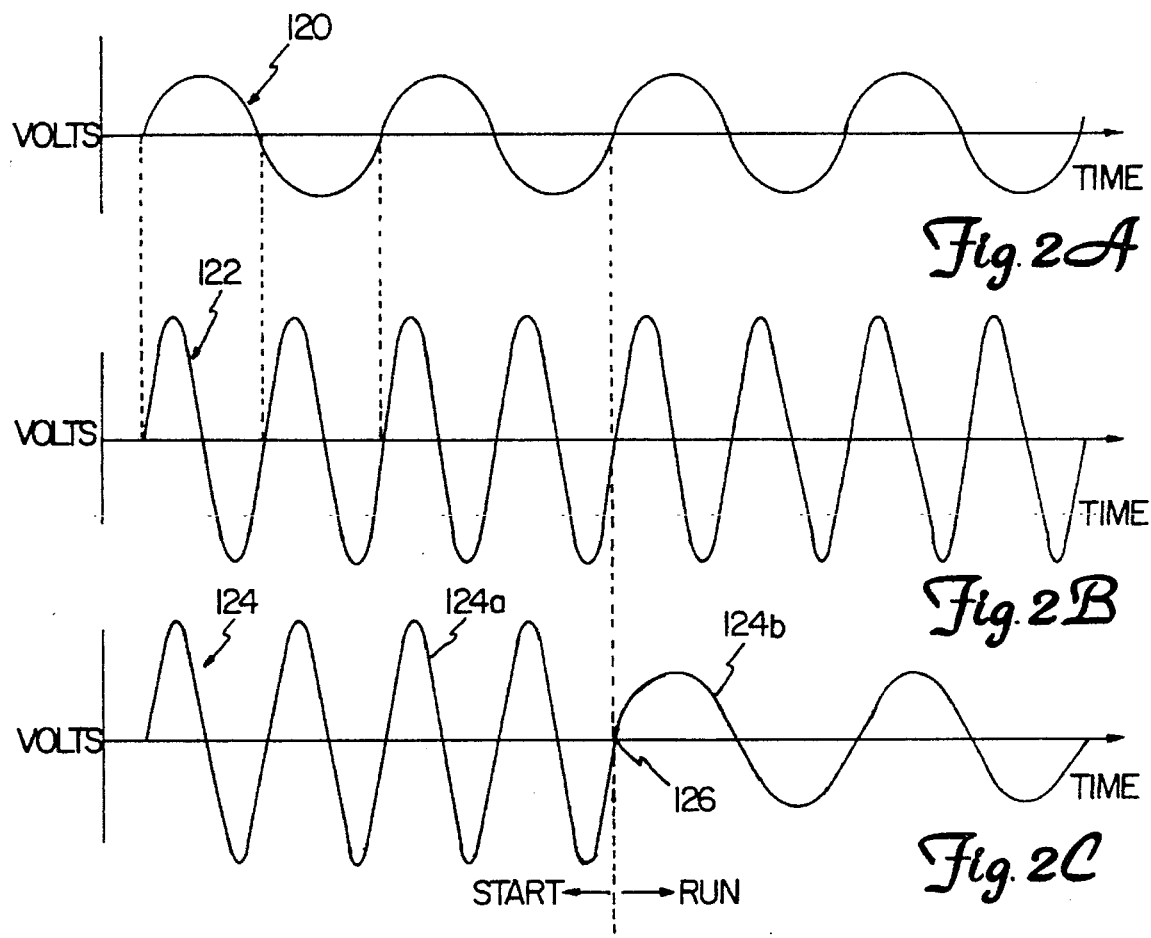
Fig. 2A
Fig. 2B
Fig. 2C
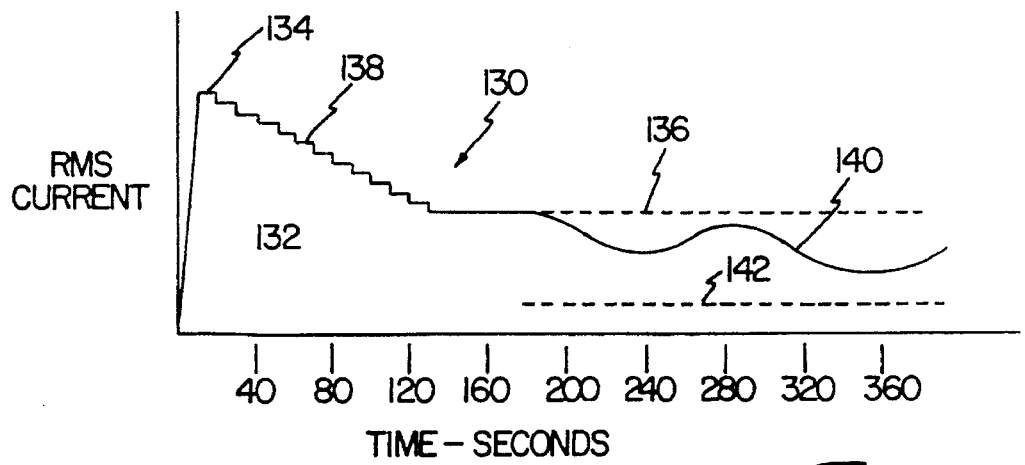
Fig. 3

CONTROL CIRCUIT FOR GAS DISCHARGE LAMPS, WHICH HAS A TRANSFORMER WITH START AND RUN WINDINGS

CROSS-REFERENCE TO RELATED APPLICATION

Cross-reference is hereby made to U.S. Ser. No. 08/487,502, entitled "Phase Control Circuit Having Independent Half Cycles," which is assigned to Nicollet Technologies Corporation and filed on even date herewith.

BACKGROUND OF THE INVENTION

The present invention is directed to a control circuit for a gas discharge lamp and, more particularly, to a control circuit having a single transformer with a high frequency start winding and a low frequency run winding on a primary side of the transformer.

Gas discharge lamps are used in a variety of applications. For example, mercury vapor lamps are used for ultraviolet (UV) curing of ink in printing presses, for curing furniture varnish, in germicide equipment for killing germs in food and its packaging, and for killing bacteria in medical operating rooms. Many other applications also exist.

A traditional circuit for controlling a mercury vapor lamp includes an AC power source which drives a primary side of a ballast transformer. A secondary side of the transformer is coupled to the lamp. The lamp includes a gas-filled tube with electrodes at each end of the tube. The secondary side of the transformer applies a voltage between the electrodes which accelerates electrons in the tube from one electrode toward the other. The electrons collide with gas atoms to produce positive ions and additional electrons. Since the current applied to the gas discharge lamp is alternating, the electrodes reverse polarity each half cycle.

Since the collisions between the electrons and the gas atoms generate additional electrons, an increase in the arc current causes the impedance of the lamp to decrease. This characteristic is known as "negative resistance." The lamp is unstable and current between the electrodes must be limited to avoid damaging the lamp. As a result, a typical control circuit includes a current limiting inductance coupled in series with the lamp. The inductance can either be a physically separate inductor or "built-in" to the transformer as a leakage inductance.

When the lamp is first started, the lamp requires a very large striking voltage to initiate an arc to ionize the gas in the lamp. The electrodes of the lamp are cold and there are almost no free electrons in the tube. The impedance of the lamp is therefore very high. The voltage required to initiate the arc exceeds that required to sustain the arc. For example, the ignition voltage may be 1,000 volts while the operating voltage may be 550 volts. Since the ballast transformer must be very large to generate the voltages necessary to ignite the lamp, the transformer is not sized for the low voltage operation subsequent to ignition. This increases the cost and size of the ballast transformer.

Lamp intensity adjustments have been made by providing a bank of capacitors in series with the lamp which are connected to one another in parallel through a plurality of mercury relay switches. The mercury relay switches are required to switch the high voltages (e.g. 1,000 volts) applied across the capacitor bank. The user changes the state of the switches to change the capacitance and thus the lamp intensity. The capacitor bank has several disadvantages. The capacitor bank is very large, expensive and unreliable. Also, the capacitor bank has a capacitance with only a few selectable magnitudes. This allows only a very coarse power adjustment. The mercury relay switches are expensive and in disfavor due to the environmental hazard presented by the mercury contained in the switches.

Lamp intensity adjustments have also been made by the use of tap-switching relays on the secondary side of the ballast transformer. This arrangement is also unreliable due to the high voltages present at the secondary side of the circuit.

SUMMARY OF THE INVENTION

The present invention is a control circuit for a gas discharge lamp, which is configured for connection between the lamp and an AC source. The AC source provides an AC run signal having a first frequency. The control circuit includes input terminals which are adapted for connection to the AC source and includes output terminals which are adapted for connection to the lamp. The control circuit further includes a ballast transformer having a primary run winding, a primary start winding and a secondary winding. The input terminals are coupled to the primary run winding. An oscillator is coupled to the primary start winding. The output terminals are coupled to the secondary winding. The oscillator generates a start signal which has a second frequency that is higher than the first frequency. A start current control switch is coupled to the oscillator. A run current control switch is coupled in series with the primary run winding. The start and run current control switches selectively apply the start and run signals to the start and run windings as a function of the current delivered to the lamp.

At startup, the oscillator applies the high frequency start signal to the primary start winding, which generates a high voltage on the secondary winding that ionizes the gas discharge lamp. When ionization occurs, current flow through the lamp increases which is sensed by the current sensor. Once the gas discharge lamp has ionized and the current flowing through the lamp has reached a selected level, the start signal is removed from the primary start winding and the run signal is applied to the primary run winding. This allows the transformer to be sized according to the lamp's run characteristics as opposed to its start characteristics.

In a preferred embodiment, the start signal and the run signal are in phase with one another and the frequency of the start signal is an even integer multiple of the frequency of the run signal. As a result, the voltage level of the run signal becomes zero at approximately the same time as the voltage level of the start signal becomes zero, thereby providing a smooth transition in the transformer from the start signal to the run signal.

The run current control switch can include a simple switch or can include a phase control circuit for controlling the average current delivered to the primary run winding. With a phase control circuit, a user can adjust the intensity of the lamp after the lamp has warmed up. In one embodiment, the phase control circuit includes independent adjustment of the positive and negative half cycles of the run signal such that the current delivered through the positive and negative half cycles can be balanced with one another to compensate for non-linearities in the lamp such that there is no net DC current delivered through the lamp.

BRIEF DESCRIPTION OF THE DRAWINGS

FIGS. 2A, 2B and 2C are timing diagrams illustrating various waveforms generated over time in the control circuit shown in FIG. 1.

FIG. 3 is a diagram of the root mean square of the current delivered through the lamp shown in FIG. 1.

DETAILED DESCRIPTION OF THE PREFERRED EMBODIMENTS

Figure 1:
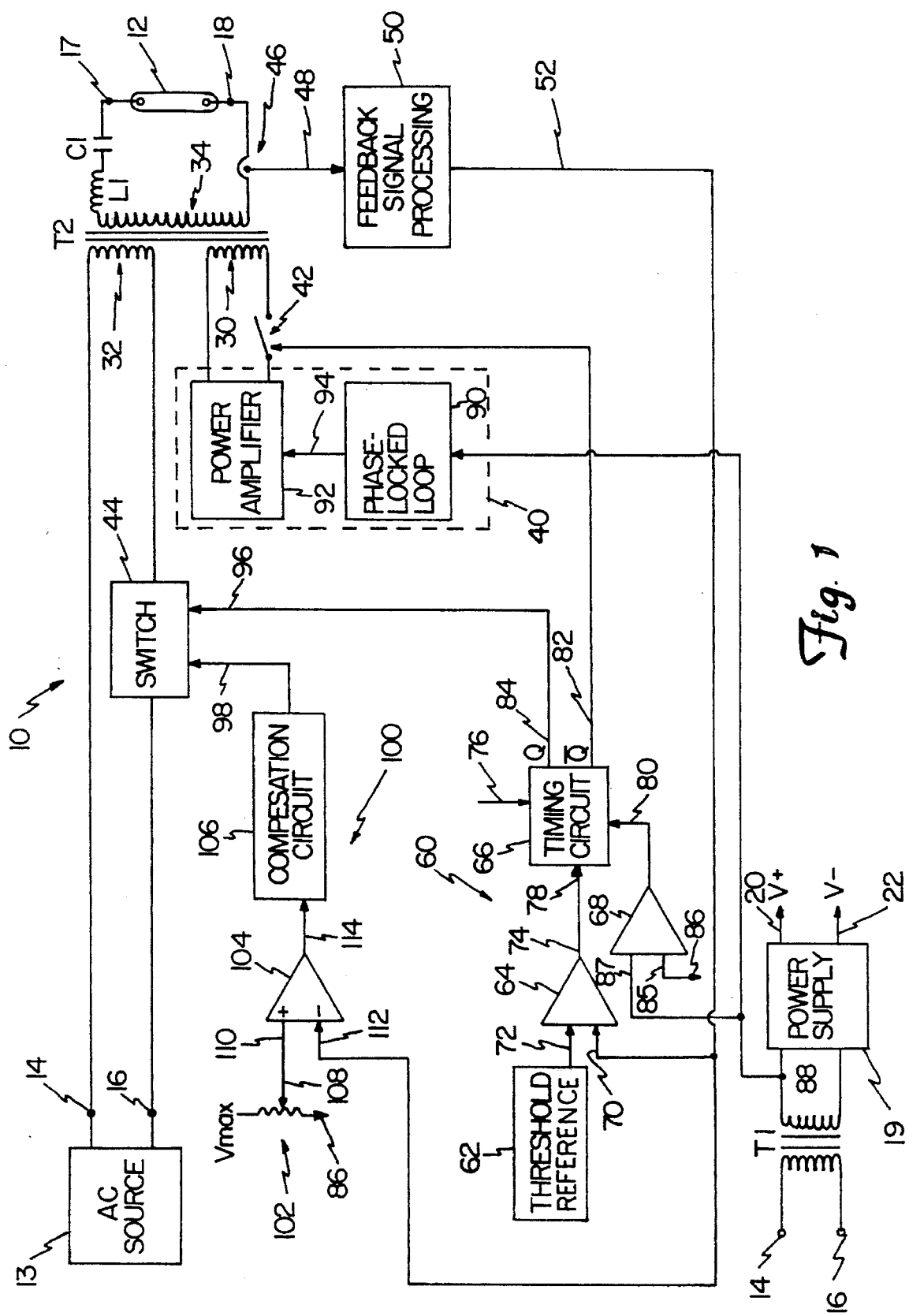
FIG. 1 is a schematic diagram of a control circuit for a gas discharge lamp, according to the present invention.

FIG. 1 is a block diagram of a control circuit according to the present invention. Control circuit 10 is coupled between gas discharge lamp 12 and AC power source 13. Control circuit 10 is coupled to AC source 13 through input terminals 14 and 16. Control circuit 10 is coupled to lamp 12 through output terminals 17 and 18. Lamp 12 can include any gas discharge lamp, such as a mercury vapor lamp. AC source 13 provides an AC run signal to control circuit 10, which drives lamp 12. In one embodiment, the AC run signal is a 120 volt, 60 Hz signal. However, any line voltage and frequency can be used in the present invention.

Control circuit 10 includes a control transformer T1, shown at the bottom of FIG. 1, which has a primary winding coupled to input terminals 14 and 16 and a secondary winding coupled to a regulated DC power supply 19. In one embodiment, control transformer T1 has a "step-down" voltage characteristic. Power supply 19 supplies a regulated V+ and V− voltage to voltage supply terminals 20 and 22 for powering the various components of control circuit 10.

Control circuit 10 further includes a power transformer T2 which has a primary side that is divided into two windings, a primary start winding 30 and a primary run winding 32. The secondary side of transformer T2 includes a secondary winding 34. Primary start winding 30 is coupled to an oscillator circuit 40. Primary run winding is coupled to input terminals 14 and 16. Secondary winding 34 is coupled in series with lamp 12 through output terminals 17 and 18. In one embodiment, transformer T2 has a "step-up" characteristic for providing a high voltage to lamp The operation of control circuit 10 includes a start phase and a run phase. In the start phase, oscillator 40 delivers a high frequency start signal to primary start winding 30 (and thus a high voltage to lamp 12) in order to ionize lamp 12. In the run phase, AC source 13 delivers a low frequency run signal to run winding 32 (and thus a lower voltage to lamp 12) in order to maintain current conduction through lamp 12. Start winding 30 has a lower number of turns than run winding 32. As a result, there are a greater number of volts per turn in start winding 30 and therefore a higher voltage produced on secondary winding 34 than with run winding 32. An example of a suitable turn ratio between start winding 30, run winding 32 and secondary winding 34 is 1:2:20. Other turn ratios can also be used with the present invention.

A switch 42 is coupled in series with start winding 30 to control the application of the start signal to start winding 30. A switch 44 is coupled in series with run winding 32 to control the application of the run signal to run winding 32. Control circuit 10 switches between the start phase and the run phase by changing the states of switches 42 and 44.

A current limiting inductor L1 is coupled in series with lamp 12. Inductor L1 can either be a physically separate inductor, or "built-in" to transformer T2 as a leakage inductance.

A capacitor C1 is coupled in series with lamp 12 to block any DC current component that would otherwise be delivered to lamp 12. DC current components have adverse effects in gas discharge lamps such as gas migration in the lamp, lower effective lamp power, and transformer saturation problems.

A current sensor or transducer 46 is coupled in series with lamp 12 to measure the actual current delivered through the lamp. Current sensor 46 generates a feedback signal 48 which is representative of the delivered current. Sensor 46 can include a current transformer, a hall-effect transducer, a resistive element with an appropriate amplifier, or any other type of current measuring transducer.

A feedback signal processing circuit 50 is coupled to current sensor 46 for processing feedback signal 48. Feedback signal processing circuit 50 can include a full-wave rectifier and low-pass filter, or a root mean square (RMS) current-to-DC converter to provide a smooth, continuous DC voltage 52 which is proportional to the effective current delivered through lamp 12.

A switch control circuit 60 is coupled in a feedback loop between feedback signal processing circuit 50 and switches 42 and 44 to control the states of switches 42 and 44 as a function of the current delivered through lamp 12. Switch control circuit 60 includes threshold reference source 62, threshold comparator 64, timing circuit 66 and zero-crossing comparator 68.

Threshold comparator 64 includes input terminals 70 and 72 and output terminal 74. Input terminal 70 is coupled to feedback signal processing circuit 50. Input terminal 72 is coupled to threshold reference source 62. Threshold reference source 62 provides a DC voltage that is representative of a threshold current level in lamp 12. During the start phase, once DC voltage 52 on comparator input terminal 70 reaches the DC voltage applied to input terminal 72 (when the lamp current level reaches the threshold current level), the output of comparator 64 changes state to initiate a change of states of switches 42 and 44. The threshold current level can be fixed or variable. In one embodiment, the threshold current level is 1.8 times the run current level in lamp 12. The output of comparator 64 is applied to timing circuit 66.

Timing circuit 66 ensures that the start signal is applied to start winding 30 for a length of time that is sufficient to warm up the electrodes in lamp 12 to a degree at which current conduction can be sustained as the start signal is removed from start winding 30 and the run signal is applied to run winding 32. Timing circuit 66 includes power-on reset input 76, output enable inputs 78 and 80 and complementary outputs 82 and 84. Power-on reset input 76 is activated to reset timing circuit 66 when control circuit 10 enters the start phase. Output enable input 78 is coupled to output 74 of comparator 64. Output enable input 80 is coupled to the output of zero-crossing comparator 68. Output 82 is coupled to switch 42 while output 78 is coupled to switch 44. Timing circuit 66 can include any well-known timing circuit, such as a "555" timer.

Zero-crossing comparator 68 allows timing circuit 66 to switch between the start phase and the run phase at a point in time at which the start signal and the run signal are both zero. This provides a smooth transition between the switching from start winding 30 to run winding 32 in ballast transformer T2. At the zero crossing, there is no stored energy within ballast transformer T2.

Zero-crossing comparator 68 includes an input terminal 85 coupled to a ground terminal 86 and in input terminal 87 coupled to a node 88 at the secondary winding of control transformer T1. Since the secondary side of control transformer T1 is a scaled-down version of the run signal provided by AC source 13, zero-crossing comparator 68 outputs a square wave that is synchronized with and has the same frequency (e.g. 60 Hz) as the voltage of the run signal. The rise and fall edges of the square wave coincide with the zero crossings of the run signal voltage.

Once lamp 12 begins to conduct current, current sensor 46 senses the current and provides feedback signal 48 to feedback signal processing circuit 50. As the lamp current reaches the threshold current level and after a sufficient length of time has passed, timing circuit 66 will, at the next zero crossing, open switch 42 to remove the start signal from start winding 30 and close switch 44 to apply the run signal to run winding 32. The length of time required for the start phase can vary depending upon the characteristics of the lamp and the voltage and frequency of the AC run signal.

While in a preferred embodiment switch control circuit 60 monitors the delivered current, the time of conduction and the zero crossings, these factors can be used individually or in various combinations to determine the point in time in which the control circuit switches from the start phase to the run phase.

During the run phase, current sensor 46 continues to monitor the current flowing through lamp 12. Feedback signal processing circuit 50 continues to convert feedback signal 48 into a DC voltage 62 which is representative of the effective current delivered through lamp 12.

In one embodiment, oscillator 40 includes a phase-locked loop 90 and a power amplifier 92. Phase-locked loop 90 receives the scaled-down reference voltage from node 88 of control transformer T1. The reference voltage allows oscillator 40 to lock onto the phase of the AC run signal provided by AC source 13. Phase-locked loop 90 provides a voltage controlled oscillator output 94 to power amplifier 92. Power amplifier 92 amplifies voltage controlled output 94 into the high frequency start signal which is applied to start winding 30 through switch 42. Voltage controlled output signal 94, and thus the start signal applied to start winding 30, has a frequency that is greater than the frequency of the AC run signal provided by AC source 13.

In alternative embodiments, switch 42 is not coupled at the output of oscillator 40. Rather, switch 42 is incorporated as an enable within the internal components of oscillator 40, such phase-locked loop 90 or power amplifier 92, or as an input to oscillator Switch 44, which is coupled in series with run winding 32, can include a simple switch or can include a phase control circuit as in the embodiment shown in FIG. 1. With a phase control circuit, the intensity of lamp 12 can be adjusted by adjusting the average current delivered to run winding 32 and thus the average current delivered to lamp 12. With conventional intensity control, banks of capacitors are connected to one another by mercury switches in series with the lamp. The user changes the states of the switches to change the capacitive magnitude, and thus the current delivered to the lamp. With phase control, capacitor banks and mercury switches are no longer required. This significantly reduces the cost of the circuit's components and increases reliability.

The phase control circuit within switch 44 is enabled at terminal 96 by timing circuit 66. When enabled, the phase control circuit conducts current in the positive and negative directions after a selected phase delay during each half cycle of the run signal. The phase delay is controlled by an adjustable control voltage applied to terminal 98.

The adjustable control voltage is generated by an intensity control circuit 100 which is coupled in a feedback loop between feedback signal processing circuit 50 and terminal 98. Intensity control circuit 100 includes a potentiometer 102, an error amplifier 104 and a frequency compensation circuit 106. Potentiometer 102 is coupled between a maximum voltage terminal Vmax and ground terminal 86. The maximum voltage at terminal Vmax can be set by a well-known resistive ladder coupled to power supply terminals 20 and 22. The user of control circuit 10 adjusts center tap 108 of potentiometer 102 to correspond to a desired lamp current level. Center tap 108 provides a DC voltage to error amplifier 104 that is representative of the desired lamp current level. Potentiometer 102 can be replaced with any other suitable control circuit. The control circuit can be coupled to a user interface or to a programmed computer for automatic control, for example.

Error amplifier 104 includes input terminals 110 and 112. Input terminal 110 is coupled to center tap 108 of potentiometer 102. Input terminal 112 is coupled to feedback signal processing circuit 50 and receives DC voltage 52 which is representative of the actual current delivered through lamp 12. Error amplifier 104 compares the desired lamp current level with the actual lamp current level sensed by current sensor 46 and provides an error voltage 114 to frequency compensation circuit 106.

Frequency compensation circuit 106 provides the control voltage to terminal 98 of switch 44, which represents a phase angle for the phase control circuit. Frequency compensation circuit 106 includes a loop compensation network for tailoring the frequency response of error amplifier 104 to obtain a desired transient response of the error amplifier and stability of the closed loop system. Circuit 106 can include a simple lag or lead-lag network, or a complete proportional-integral-differential (PID) compensation network.

Figure 1A:
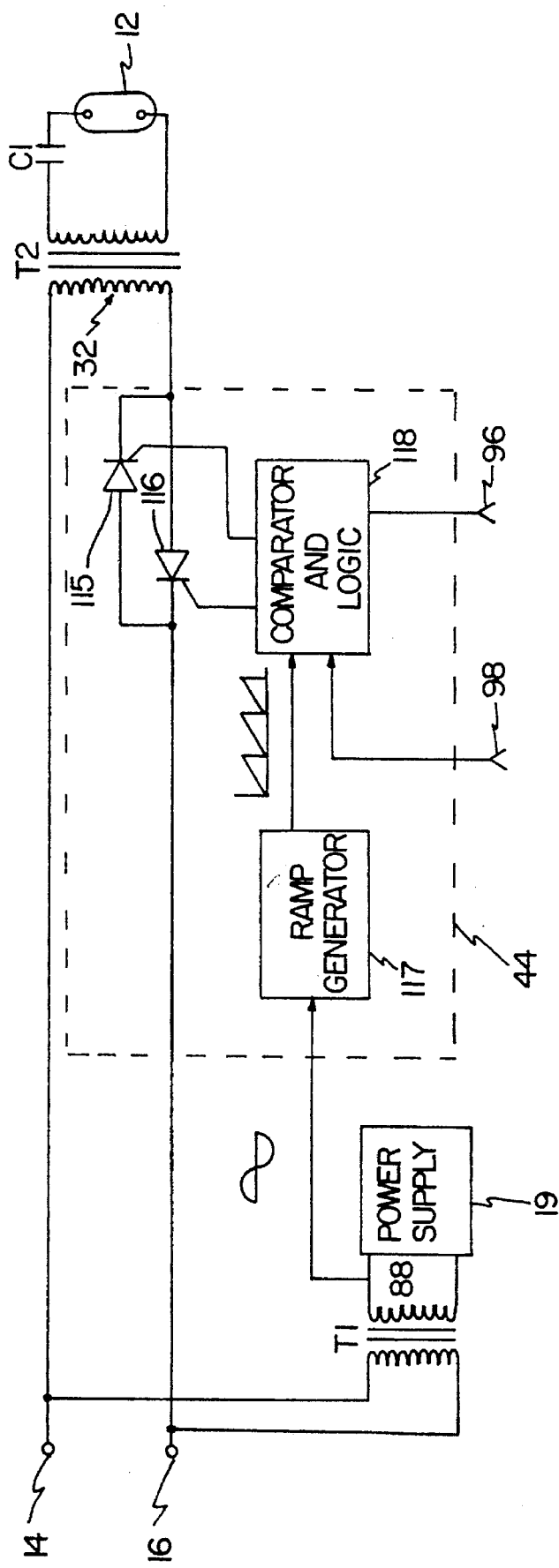
FIG. 1A is a more detailed schematic diagram of a phase control circuit shown in FIG. 1.

FIG. 1A is a more detailed schematic diagram of the phase control circuit (switch 44) shown in FIG. 1. The phase control circuit within switch 44 includes a pair of thyristors 115 and 116, such as silicon-controlled rectifiers (SCRs) which are connected anti-parallel to one another. The gate of each thyristor is controlled by a trigger circuit formed by ramp generator 117 and comparator and logic circuit 118. Ramp generator 17 is connected between node 88 of control transformer T1 and circuit 118. Ramp generator generates a voltage ramp for each half cycle of the AC drive signal. The control voltage applied to input 98 is compared to the ramp voltage. When the ramp voltage reaches the control voltage, circuit 118 provides a trigger signal to the gates of thyristors 115 and 116 to trigger conduction in one of the thyristors. The thyristors are therefore triggered at a selected phase delay within each half cycle.

If the user increases the control voltage provided by potentiometer 102 (shown in FIG. 1), the phase delay within each half cycle will increase, resulting in switch 44 conducting current during a smaller portion of each half cycle and a smaller average current being delivered to lamp 12. The user can therefore adjust the intensity of lamp 12 by adjusting potentiometer 102.

Because of the non-linear nature of high intensity gas discharge lamps, it has been found that the phase control circuit will not work properly without capacitor C1 coupled in series with lamp 12. Any slight DC imbalance in the current delivered to lamp 12 causes the entire current-voltage (I–V) operating curve of the lamp to shift, so that the breakdown voltage of lamp 12 is no longer symmetrical in the positive and negative directions. The lamp becomes a rectifier, with a low breakdown voltage in one direction and a very high breakdown voltage in the other direction. Since the phase control provides symmetrical voltage on each half cycle of the current source, only one half cycle will actually conduct through lamp 12 and the other half cycle will not, resulting in a net DC current component delivered to the lamp.

This half-wave DC mode will result in numerous problems, like mercury migration in the lamp, lower effective lamp power and transformer saturation problems. Capacitor C1 blocks DC current components from reaching lamp 12.

In an alternative embodiment, the phase control circuit discussed above is replaced with a phase control circuit having independent control of each half cycle. The phase delays of the positive and negative half cycles (i.e. the gates of thyristors 115 and 116) are controlled independently by a trigger circuit and balanced with one another as a function of the current delivered through the lamp to ensure that there is no net DC current delivered to the lamp. An integrator is used to integrate the current delivered to the lamp during each cycle and create a correction signal that is added or subtracted with a summing amplifier from the control voltage of the respective phase delay trigger circuit such that the overall current delivered to the lamp has no net DC component. Capacitor C1 can therefore be eliminated from the secondary side of transformer T2. Independent half cycle phase control is discussed in greater detail in a U.S. Patent Application entitled "Phase Control Circuit Having Independent Half Cycles," which was filed on even date herewith and is assigned to Nicollet Technologies Corporation. This application is hereby incorporated by reference.

In yet another alternative embodiment, ramp generator 117 and comparator 118 are replaced with a programmed digital timing circuit which generates the trigger pulses at the appropriate times as a function of the control voltage applied to terminal 98 and the enable signal applied to terminal 96. Other analog and digital timing circuits can also be used with the present invention. In addition, both the timing circuit and the ramp generator can be synchronized with the AC source by providing a zero-crossing comparator in series with node 88 (in FIG. 1A).

FIGS. 2A, 2B and 2C are timing diagrams illustrating various waveforms generated over time in the control circuit shown in FIG. 1. In FIG. 2A, waveform 120 represents the voltage of the run signal generated by AC source 13. In FIG. 2B, waveform 122 represents the start signal voltage generated by oscillator 40. The peak magnitude of the start signal voltage depends upon a number of factors, including the desired ignition voltage on secondary winding 34, the frequency of the start signal, the turns ratio of transformer T2 and the lamp characteristics. As mentioned above, the frequency of the start signal is preferably an even integer multiple of the frequency of the run signal (waveform 120). For example, the even integer multiple may be 2, 4, 6, 8, etc. As shown in FIGS. 2A and 2B, waveform 122 has a frequency that is twice the frequency of waveform 120 such that each zero crossing of waveform 120 corresponds in time with a zero crossing of waveform 122. This allows an even transition 126 between the start signal and the run signal in transformer T2, as shown in FIG. 2C.

FIG. 2C illustrates the voltage waveform 124 generated in secondary winding 34 of transformer T2. Waveform 124 is divided into a start phase 124a, which is prior to transition 126, and a run phase 124b, which is subsequent to transition 126. At transition 126, the control circuit removes the start signal from start winding 30 and applies the run signal to run winding 32. The striking voltage applied to lamp 12 by start phase 124a is larger than the run voltage applied by run phase 124b. In one embodiment, the voltage applied by start phase 124a is twice the voltage applied by run phase 124b. As shown in FIG. 2C, the zero crossings of phases 124a and 124b are matched with one another at transition 126 such that there is a smooth current transition in transformer T2.

FIG. 3 is a diagram of the root mean square (RMS) current delivered through lamp 12 over time. As shown by waveform 130, the RMS current in lamp 12 begins at zero. Once oscillator 40 begins to apply the start signal to start winding 30, the striking voltage generated across secondary winding 34 causes lamp 12 to begin conducting current. The RMS current rises at 132 to a threshold level 134. A few cycles of the start signal are typically sufficient to ignite lamp 12, although the particular number of cycles may vary from application to application.

Once the RMS current reaches threshold level 132, control circuit 10 removes the start signal from start winding 30 and applies the run signal to run winding 32. Since the threshold current level 134 is greater than a maximum run current 136, which is set by the maximum voltage Vmax applied to potentiometer 102, the RMS current through lamp 12 ramps down at 138 to maximum run current 136. Ramp 138 can result from the lamp's characteristics or can be a controlled ramp which has a current profile that is selected to optimize the lamp warm-up period and to maximize lamp life. The controlled ramp can be achieved by replacing potentiometer 102 (shown in FIG. 1) with a control circuit which controls the DC voltage applied to error amplifier 104 during the warm-up period. The control circuit would have a user interface to allow the user to adjust lamp intensity. Ramp 138 can have various profiles, such as a slow ramp down, a quick ramp down, or a steady level followed by a ramp down. Once the RMS current reaches maximum run current 136, the RMS current can be adjusted between maximum run current 136 and minimum run current 142, as shown in waveform portion 140.

Although the present invention has been described with reference to preferred embodiments, workers skilled in the art will recognize that changes may be made in form and detail without departing from the spirit and scope of the invention. For example, the lamp intensity control circuit can be eliminated or replaced with a capacitor bank coupled in series with the lamp. The capacitor bank can have a selectable capacitive magnitude to allow the user to control the average current delivered through the lamp.

Numerous other changes can be made to the embodiments disclosed herein. For example, start winding 30 can be either a separate winding than run winding 32 or a tapped portion of run winding 32.

What is claimed is:

1. A control circuit for a gas discharge lamp, which is configured for connection to a source of an AC run current, wherein the control circuit comprises:

input terminals which are adapted to be coupled to the source of the AC run current;

output terminals which are adapted to be coupled to the gas discharge lamp;

a transformer having a primary run winding, a primary start winding and a secondary winding, wherein the primary run winding is coupled to the input terminals and the secondary winding is coupled in parallel with the output terminals;

a run current control switch coupled in series with the primary run winding;

an oscillator coupled to the primary start winding of the transformer;

a start current control switch coupled to the oscillator;

a current sensor coupled in series with the output terminals; and a feedback loop coupled between the current sensor and the run current control switch and between the current sensor and the start current control switch such that the run current control switch and the start current control switch are responsive to the current sensor.

2. The control circuit of claim 1 wherein the primary start winding is a separate winding from the primary run winding.

3. The control circuit of claim 1 wherein the primary start winding is a portion of the primary run winding.

4. The control circuit of claim 1 and further comprising:

a run voltage reference generator coupled to the input terminals; and wherein the oscillator includes a phase-locked loop which is coupled to the run voltage reference generator such that the oscillator is in phase with the source of the run current.

5. The control circuit of claim 4 and further comprising:

a power amplifier coupled between the phase locked loop and the start winding.

6. The control circuit of claim 1 wherein the run current has a first frequency and the oscillator is adapted to generate a start signal having a second frequency that is an even integer multiple of the first frequency.

7. The control circuit of claim 1 wherein the feedback loop comprises:

a threshold reference source; and a threshold comparator having a first comparison input coupled to the threshold reference source, a second comparison input coupled to the current sensor, and a comparison output coupled to the run current control switch and the start current control switch.

8. The control circuit of claim 1 wherein the feedback loop comprises a time delay circuit having an input coupled to the current sensor and an output coupled to the start current control switch and the run current control switch, and wherein the timing circuit output has a time delay relative to the timing circuit input.

9. The control circuit of claim 1 and further comprising:

a run voltage reference generator coupled to the input terminals;

a zero voltage reference source; and a zero-crossing comparator having a first comparison input coupled to the run voltage reference generator, a second comparison input coupled to the zero voltage reference source, and a comparison output coupled to the feedback loop such that the feedback loop is synchronized with zero voltage crossings in the source of the run current.

10. The control circuit of claim 1 wherein the run current control switch comprises a phase control circuit.

11. The control circuit of claim 10 and further comprising:

a source of an adjustable intensity reference voltage;

an error amplifier having a first amplifier input coupled to the source of the adjustable intensity reference voltage, a second amplifier input coupled to the feedback loop, and an amplifier output coupled to the phase control circuit.

12. A control circuit for a gas discharge lamp, which is configured for connection to a source of an AC run signal that has a first frequency, wherein the control circuit comprises:

input terminals which are adapted to be coupled to the source of the AC run signal;

output terminals which are adapted to be coupled to the gas discharge lamp;

a transformer having a primary run winding, a primary start winding and a secondary winding, wherein the primary run winding is coupled to the input terminals and the secondary winding is coupled in parallel with the output terminals;

oscillator means coupled to the primary start winding for generating a start signal which has a second frequency that is higher than the first frequency;

means for sensing current flow through the output terminals;

means for selectively applying the start signal to the primary start winding as a function of the sensed current through the output terminals; and means for selectively applying the run signal to the primary run winding as a function of the sensed current through the output terminals.

13. The control circuit of claim 12 wherein the primary start winding is a separate winding than the primary run winding.

14. The control circuit of claim 12 wherein the primary start winding is formed of a portion of the primary run winding.

15. The control circuit of claim 12 wherein the second frequency is an even integer multiple of the first frequency.

16. The control circuit of claim 12 wherein the oscillator means comprises means for locking a phase of the start signal with a phase of the run signal.

17. The control circuit of claim 12 wherein:

the means for selectively applying the start signal comprises means for removing the start signal from the primary start winding as a function of the sensed current flow through the output terminals; and the means for selectively applying the run signal comprises means for applying the run signal to the primary run winding after the start signal is removed from the primary start winding.

18. The control circuit of claim 12 and further comprising:

a switching circuit coupled in a feedback loop between the means for sensing current flow and the means for selectively applying the start and run signals, wherein the switching circuit comprises means for comparing a selected threshold current with the sensed current flow.

19. The control circuit of claim 18 wherein the switching circuit further comprises:

means for generating a start time delay, which is coupled to the means for comparing; and means for detecting when a voltage level of the run signal crosses a zero level, which is coupled to the means for generating a start time delay, such that the means for selectively applying the run signal applies the run signal to the primary run winding at the next detected zero crossing of the run signal after both the sensed current reaches the selected threshold current and the start time delay has elapsed.

20. The control circuit of claim 12 wherein:

the run signal is an alternating current signal having a plurality of sequential positive and negative half cycles; and the means for selectively applying the run signal includes phase control means coupled in series with the primary run winding, for applying the run signal to the primary run winding during selected portions of each half cycle to control power delivered to the gas discharge lamp.

21. A method of controlling a gas discharge lamp, comprising:

coupling the gas discharge lamp in parallel with a secondary winding of a transformer;

applying an alternating current (AC) start signal to a primary start winding of the transformer;

sensing current flow generated through the gas discharge lamp in response to the AC start signal;

removing the AC start signal as a function of the sensed current flow through the gas discharge lamp; and applying an alternating current (AC) run signal to a primary run winding of the transformer after removing the AC start signal.

22. The method of claim 21 wherein the steps of applying the AC start signal and the AC run signal comprise applying the AC start signal at a first frequency and applying the AC run signal at a second frequency, wherein the first frequency is an even integer multiple of the second frequency.

23. The method of claim 21 wherein the steps of applying the AC start signal and the AC run signal comprise applying the AC start signal and applying the run signal in phase with one another.

24. The method of claim 21 wherein the step of applying the AC run signal comprises applying the AC run signal from a time at which a voltage level of the AC run signal crosses zero.

25. The method of claim 21 wherein the AC run signal includes a plurality of sequential positive and negative half cycles and wherein the step of applying the AC run signal comprises:

applying the AC run signal during selected portions of each half cycle to control power delivered to the gas discharge lamp.

26. The method of claim 25 wherein the step of applying the AC run signal further comprises:

applying the AC run signal after a first phase delay in each positive half cycle;

applying the run signal after a second phase delay in each negative half cycle; and balancing the first and second phase delays as a function of the sensed current flow such that a net direct current (DC) flow in the gas discharge lamp is zero.

27. A control circuit for a gas discharge lamp, which is configured for connection to a source of an AC run signal that has a first frequency, wherein the control circuit comprises:

input terminals which are adapted to be coupled to the source of the AC run signal;

output terminals which are adapted to be coupled to the gas discharge lamp;

a transformer having a primary run winding, a primary start winding and a secondary winding, wherein the primary run winding is coupled to the input terminals and the secondary winding is coupled in parallel with the output terminals;

an oscillator having an oscillator output which is coupled to the primary start winding and which generates a start signal having a second frequency that is higher than the first frequency;

a current sensor coupled in series with the output terminals, wherein the current sensor has a sensor output which generates a feedback signal as a function of current flowing through the secondary winding;

a start current control switch coupled to the oscillator, which selectively applies the start signal to the primary start winding as a function of the feedback signal; and a run current control switch coupled in series with the primary run winding, which selectively applies the AC run signal to the primary run winding as a function of the feedback signal.

28. A gas discharge lamp control circuit configured for controlling power delivered from an AC source to a gas discharge lamp, wherein the AC source supplies an AC drive signal having a plurality of sequential positive and negative half cycles, the control circuit comprising:

input terminals which are adapted to be coupled to the AC source;

output terminals which are adapted to be coupled to the gas discharge lamp;

a transformer having a primary winding and a secondary winding, wherein the primary winding is coupled to the input terminals and the secondary winding is coupled in parallel with the output terminals;

a capacitor coupled in series with the output terminals;

phase control means coupled in series with the primary winding for conducting current of the AC drive signal after a first phase delay during the positive half cycles and for conducting current of the AC drive signal after a second phase delay during the negative half cycles; and trigger means coupled to the phase control means for determining the first and second phase delays.

* * * * *